Patented Aug. 15, 1950

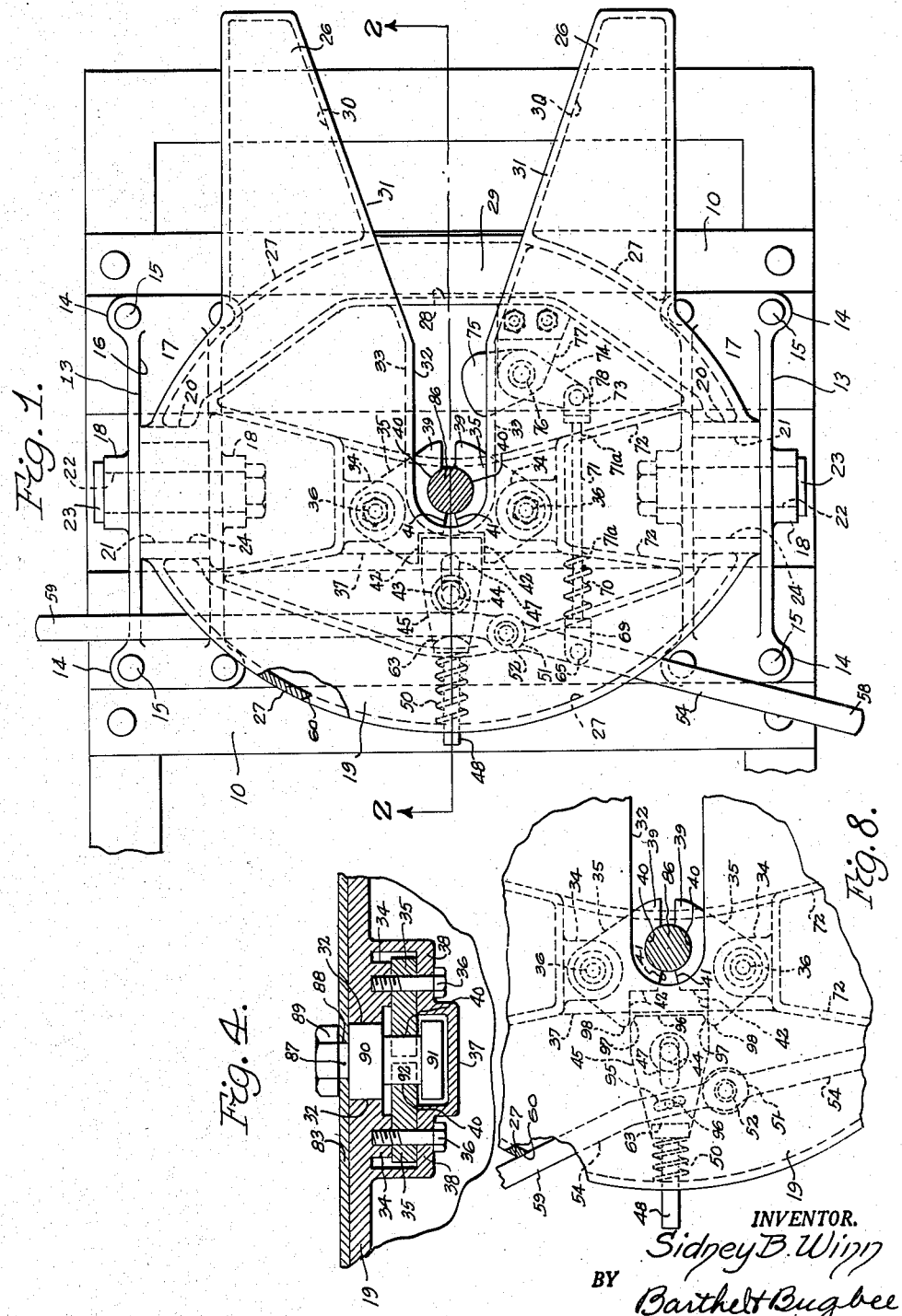

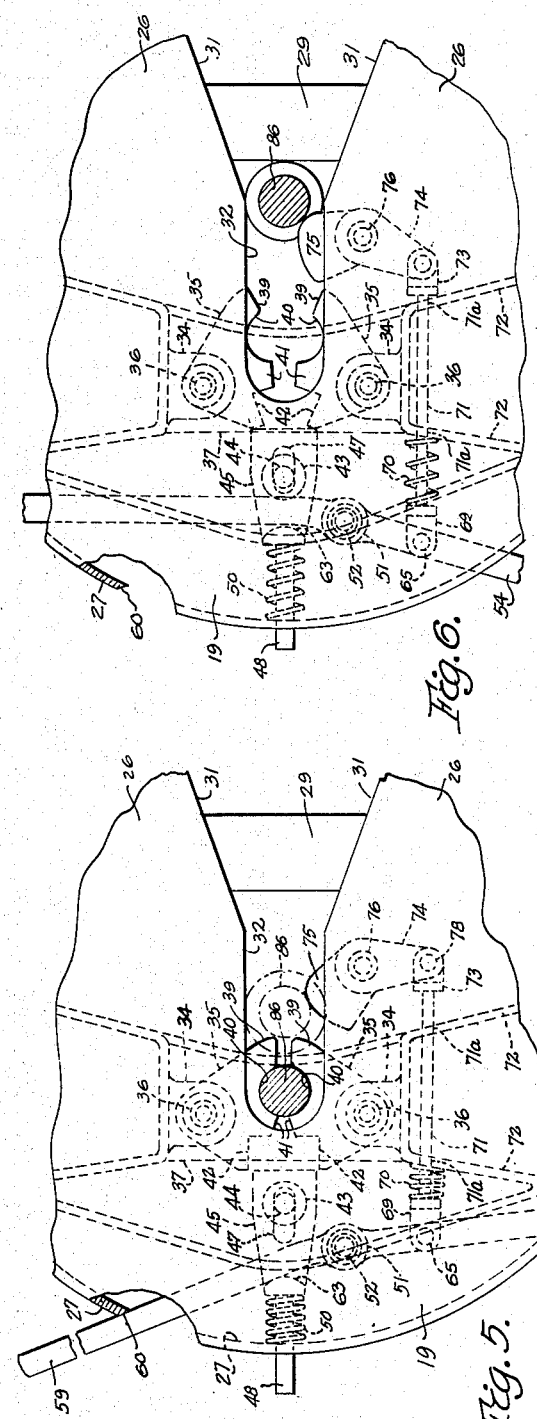

2,519,090

UNITED STATES PATENT OFFICE 2,519,090

FIFTH WHEEL OPERATING DEVICE

Sidney B. Winn, Lapeer, Mich.

Application October 21, 1946, Serial No. 704,690

13 Claims. (Cl. 280—33.05)

This invention relates to tractor-trailer vehicles, and in particular to coupling devices or fifth wheel mechanisms for such vehicles.

One object of this invention is to provide a coupling device for tractor-trailer vehicles having coupling jaws which are releasable for uncoupling the vehicles by mechanism operable from either side of the tractor.

Another object is to provide a coupling device for tractor-trailer vehicles, as set forth in the preceding object, wherein the device is operated by a double-ended lever connected thereto near its midportion and having handle portions projecting from opposite sides of the tractor so that an operator can operate the device with ease and freedom from danger of accident regardless of which side of the tractor he is facing.

Another object is to provide a safety coupling device for tractor-trailer vehicles, as set forth in the preceding object, wherein the coupling device is automatically set for recoupling when the the tractor and trailer are intentionally separated, this re-coupling automatically taking place when the tractor and trailer are again moved into draft engagement with one another.

Another object of this invention is to provide a safety coupling device for tractor-trailer vehicles having mechanism controlled by the coupling device for preventing the separation of the tractor and trailer upon failure of the coupling device, the coupling device itself being operable from either side of the tractor.

Other objects and advantages will become apparent during the course of the following description of the accompanying drawings, wherein:

Figure 1 is a top plan view of a tractor-trailer coupling device according to a preferred form of the invention;

Figure 2 is a longitudinal vertical section taken along the line 2—2 in Figure 1;

Figure 3 is a left-hand end elevation of the tractor-trailer coupling device shown in Figure 5;

Figure 4 is a vertical cross-section through the tractor-trailer coupling device taken along the line 4—4 in Figure 2;

Figure 5 is a top plan view similar to the central portion of Figure 1, but showing the coupling jaw locking bolt in its retracted position to enable separation of the tractor-trailer combination;

Figure 6 is a top plan view similar to Figure 5, but showing the coupling jaws separated to receive the king pin of the trailer, with the coupling jaw locking bolt retracted in response to the engagement of the king pin with a tripping member; and Figure 7 is an enlarged fragmentary side elevation of the detent or latch for the operating lever in Figure 5, showing the interlocking detent portions thereof, with the operating lever in cross-section; and Figure 8 is a fragmentary top plan view of the central portion of a tractor-trailer coupling device lacking the auxiliary safety jaw, with the parts in the positions corresponding to those of Figure 5, ready for uncoupling to take place.

Referring to the drawings in detail, Figure 1 shows a frame 10 mounted on and forming part of the chassis of a tractor vehicle (not shown) of any conventional design whose details form no part of the present invention. The frame 10 is bolted or otherwise secured to the tractor chassis in any suitable manner (not shown).

Mounted on and rising from the frame 10 is a trunnion support 13 (Figure 2) having flanged portions 14 bolted as at 15 to the frame 10. The trunnion support 13 is provided with a pair of spaced triangular web portions 16 interconnected by a base portion 17 and provided with bearing bosses 18 (Figure 1). Trunnioned between the web portions 16 is a turntable 19 having bearing bosses 20 thereon provided with aligned openings 21 adapted to register with bores 22 in the bearing bosses 18 so as to receive pivot bolts 23 which serve as trunnions. A block 24 of rubber or rubber-like material is interposed between each pivot pin 23 and the opening 21 to cushion the shocks arising during operation.

The turntable 19 is provided with a pair of tail portions 26 in the form of inclined ramps. The turntable 19 is also provided with edge flanges 27 and 28 on the underside thereof connected by a web 29 interconnecting the tail portions 26 (Figure 2). The tail portions 26 are provided with marginal edge flanges 30 converging as at 31 (Figure 1), these terminating at their inner ends in a U-shaped kingpin receiving slot 32 extending to the center of the turntable 19. The slot 32 is provided with a marginal depending flange 33 to reinforce the slot 32 and turntable 19 generally.

The turntable 19 is provided on its underside with a pair of depending bosses 34 (Figure 4) carrying pivot bolts 36 upon which are pivotally mounted coupling elements consisting of a pair of coupling jaws 35. The turntable 19 is also provided with a stirrup 37 extending beneath the bosses 34 and coupling jaws 35 and having portions 38 with openings through which the pivot bolts 36 pass. This arrangement provides support for the pivot bolts 36 both above and below the coupling jaws 35.

The coupling jaws 35 are provided at their forward ends with projections 39 behind which are semi-circular bores 40 which cooperate with rear jaw projections 41 to provide a circular bore 40 for receiving the king pin of the trailer. The rear portion of each coupling jaw 35 is provided with an L-shaped notch 42 (Figures 1, 5 and 6).

Extending downward from the underside of the turntable 19 to the rear of the coupling jaws 35 is a boss 43 threaded to receive a guide bolt 44 upon which is slidably mounted a locking bolt 45 (Figure 2). The guide bolt 44 carries a washer 46 and passes through a slot 47 in the locking bolt 45 before it enters the threaded boss 43. The forward end of the locking bolt 45 is substantially rectangular so as to slide into the rectangular keeper formed by the notches 42 when the coupling jaws 35 are in their closed positions, (Figure 1). The locking bolt 45 at its rear end is provided with a guide rod 48 which extends through an opening 49 in the depending guide flange 27 of the turntable 19 so as to guide the locking bolt 45 in its reciprocation. A coil spring 50 is mounted on the guide rod 48 (Figure 2) with its forward end engaging the bolt 45 and its rear end abutting the flange 27 so as to normally urge the bolt 45 forward into the notches 42 into its clamping jaw locking position.

The foregoing mechanism is described and claimed in my co-pending patent application Serial No. 531,701 filed April 19, 1944 for a Safety Jaw for Fifth Wheel Assembly which matured into Patent No. 2,411,404, issued November 19, 1946. The present invention described below is an improvement upon my previous invention in that it enables operation of this mechanism from either side of the tractor vehicle.

Depending from the underside of the turtable 19 (Figure 3) is an internally threaded boss 51 having a pivot stud 52 threaded therein and passing through an opening 53 in an operating lever 54, the opening 53 being considerably larger than the diameter of the stud 52 as is clearly seen in Figure 3. The pivot stud 52 is provided with a coil spring 55, mounted between washers 56 and held in position by a nut 57 threaded onto the stud 52. Thus, the coil spring yieldingly urges the central portion of the operating lever 54 upward toward the boss 51, so that the operating lever 54 loosely and slidably engages the stud 52. The operating lever 54, however, is provided with handle portions 58 and 59 projecting from opposite sides of the turntable 19 so as to enable the operating lever 54 to be operated from either side of the tractor. In order to releasably lock the operating lever 54 in one position, the edge flange 27 of the turntable 19 is provided with a downwardly opening notch 60 (Figures 1 and 3) for receiving the operating lever 54, the notch 60 on its outer side being bounded by a lug 61 (Figure 3) extending downward from the edge flange 27.

Between the pivot stud 52 and the notch 60, the operating lever 54 passes through an opening 62 in the locking bolt 45, the opening 62 at its rear end terminating in an arcuate abutment portion 63 (Figure 1). On the opposite side of the operating lever 54 from its connection with the locking bolt 45, the lever 54 is provided with an opening 64 in which is mounted the pin 65 passing through the upper and lower openings 66 and 67 and a washer 68 of a clevis 69 (Figure 3). The clevis 69 is engaged by a coil spring 70 (Figure 1) encircling the control rod 71 which is reciprocably mounted in openings 71a of re-inforcing ribs 72 formed on the lower side of the turntable 19. The forward end of the coil spring 70 abuts one of the ribs 72. The opposite end of the control rod 71 is connected to a clevis 73 which is pivoted to the tail portion 74 of an auxiliary locking jaw 75 which in turn is pivoted to the underside of the turntable 19 by means of a pivot pin 76 mounted in a bracket 77 bolted to the lower side of the turntable 19. A pivot pin 78 interconnects the clevis 73 and tail portion 74 so that reciprocation of the control rod 71 will swing the auxiliary jaw 75 to and fro into and out of the king pin slot 32 around the pivot pin 76. The coil spring 70 normally urges the auxiliary jaw 75 into the slot 32 (Figure 1) and holds the operating lever 54 in its normal position, aided by the coil spring 50.

Cooperating with the foregoing tractor vehicle coupling construction is a trailer chassis 80 having side rails 81 of channel cross-section interconnected at its front end by a transverse frame member 82. Secured as by welding to the front end of the chassis 80 is a turntable engaging plate 83 extending across the underside thereof. The turntable engaging plate 83 has a relatively smooth bottom surface 84 for engaging the turntable 19 and is provided with an upturned forward edge portion 85 to facilitate engagement with the inclined tail portions 26 during the coupling operation. Mounted in the turntable engaging plate 83 (Figure 2) is a king pin 86 having its threaded end 87 extending through an opening 88 therein and held in position by a nut 89 threaded upon the threaded portion 87 so as to anchor the king pin 86 in position. The king pin 86 is provided with upper and lower flanges or heads 90 and 91 with a neck portion 92 therebetween, the head 90 fitting into and slidably engaging the side walls of the king pin notch 32 and the neck portion 92 being engaged by the portions 40 of the coupling jaws 35. The lower head 91 prevents the coupling jaws 35 from sliding off the king pin 86.

*Operation*

In the operation of the tractor-trailer coupling device of this invention, let it be assumed that the tractor and trailer are coupled in draft relationship (Figure 1) with the portions 40 of the coupling jaws 35 engaging the neck portion 92 of the king pin 86. Since the coupling jaws 35 are in their closed positions, the locking bolt 45 is urged forward into the locking notches 42 by the coil spring 50 so as to prevent the opening of the coupling jaws 35 (Figure 1). With the parts in this position, the coil spring 70 urges the clevis 69, operating lever 54 and control rod 71 rearward so as to swing the tail portion 74 of the auxiliary jaw 75 toward the rear and project the auxiliary jaw 75 into the slot 32. In this position, the auxiliary jaw 75 partially closes the king pin slot 32 to a sufficient extent to obstruct the passageway therein so as to prevent the king pin 86 from passing outward through the slot 32. Thus, should the coupling jaws 35 fail to hold the king pin 86, the latter although escaping from the coupling jaws 45, would immediately be intercepted by the auxiliary locking jaws 75 and prevented from passing out of the slot 32 (Figure 1).

To uncouple the vehicles, the operator grasps either of the handles 58 or 59 and swings the operating lever 54 counterclockwise around its pivot stud 52 hooking the portion adjacent the lug 61 up into the notch 60 (Figures 5 and 7)

which has an inclined wall fitting a similarly inclined edge portion of the lever 54. This action retracts the locking bolt 45 from the notches 42 and compresses the coil spring 50 and the latter holds the lever 54 in the notch 60. This action also pushes the control rod 71 and tail portion 74 forward, swinging the auxiliary jaw 75 rearward out of the king pin slot 32 a sufficient distance to permit the king pin 86 to force its way by it, at the same time compressing the coil spring 70 around the control rod 71.

With the parts moved into the position of Figure 5, the tractor may then be driven forward to swing the coupling jaws 35 apart into the positions shown in Figure 6, since the locking bolt 45 has been withdrawn from the notches 42. As the turntable slot 32 moves forward relatively to the king pin 86, the latter trips the auxiliary locking jaw 75, swinging the operating lever 54 a slight distance so as to disengage it from the notch 60. The coil spring 55 then tilts the lever 54 upward against the lower end of the boss 51 which acts as a fulcrum to swing the operating lever 54 into a substantially horizontal position below its path of engagement with the detent notch 60 to push the lever 54 into its Figure 6 position.

To recouple the tractor and trailer, the tractor is backed toward the trailer so that the ramp tail portions 26 slide beneath the turntable engaging plate 83, assisted by the upturned portions 85 thereof. While the backing operation is proceeding, the king pin 86 is guided into the king pin slot 32 by means of the flared edge flanges 31 so that the king pin 86 engages the auxiliary locking jaw 75 and tends to force the latter out of the notch 32. The depressing of the auxiliary locking jaw 75 in this manner permits the king pin 86 to pass by it, and the coil spring 70 restores the auxiliary locking jaw 75 to its previous position projecting into the slot 32.

After the king pin 86 has passed the auxiliary locking jaw 75, the continued backing of the tractor moves the coupling jaws 35 rearward in their open positions (Figure 6) so that they pass around the neck portion 92 of the king pin 86 into the arcuate portions 40 of the coupling jaws 35. The engagement of the king pin 86 with the portions 41 of the coupling jaws 35 swings the latter on their pivot bolts 36 into their closed positions around the king pin 86, at the same time swinging the notches 42 wide open (Figure 5) so as to enable the locking bolt 45 to enter. The locking bolt 45 is immediately projected into the notches 42 by the coil spring 50 which has been compressed meanwhile, and the consequent swinging of the operating lever 54 in a clockwise direction around its pivot stud 52 moves the auxiliary locking jaw 75 into the king pin slot 32 in the position shown in Figure 1. Thus, the auxiliary locking jaw 75 again obstructs the king pin slot 32 to a sufficient extent to prevent the escape of the king pin 86 should the coupling jaws 35 fail and open or break for any reason whatever. The tractor and trailer vehicles are thus retained in their draft relationship despite the possible failure of the coupling jaws 35.

It will be self-evident that the invention is not limited to coupling devices equipped with the auxiliary safety jaw 75, but that it may also be used in coupling devices lacking this safety jaw and its accompanying mechanism.

The modification shown in Figure 8 is generally similar to the tractor-trailer coupling device shown in Figures 1 to 7 inclusive and similar parts are designated with the same reference numerals. In Figure 8, however, the safety jaw 75 has been omitted, together with its arm 74, connecting rod 71 and spiral spring 70. Instead, the operating lever 54 at the location where it crosses the bolt 45 is provided with an elongated slot 95 which is engaged by a pin 96 connected to the bolt 45. The forward end 96 of the bolt 45 is extended somewhat beyond the corresponding end in Figure 5, and the corners thereof are beveled as at 97 for camming engagement by the rounded corners 98 of the rear portions of the coupling jaws 35 adjacent their L-shaped notches 42.

In the operation of the modification shown in Figure 8, let it be assumed that the tractor and trailer vehicles are coupled, with the king pin 86 locked within the semi-circular bores 40 in the coupling jaws 35 and that the operating lever 54 is in a position corresponding to Figure 1 so that it swings freely out of the path of the detent notch 60. To uncouple the vehicle, the operator grasps either end of the operating lever 54 and moves it in a direction to withdraw the bolt 45 from the L-shaped notches 42 in the coupling jaws 35, at the same time swinging it upward so that it engages the detent notch 60 on the edge flange 27.

The tractor is now driven forward, the trailer and its king pin 86 remaining stationary. Consequently, the king pin 86 forces the coupling jaws 35 apart as it passes through the gap between the forward end projections 39. As the coupling jaws 35 are thus swung apart, their rounded corners 98 bear against the beveled corners 97 of the bolt 45, producing a camming action which moves the bolt 45 and guide rod 48 rearward, compressing the coil spring 50. As the bolt 45 is thus moved rearward, the pin 96 slidably engages the operating lever 54 to swing the latter out of the detent notch 60, whereupon the upward thrust of the coil spring 55 (Figure 3) immediately pushes the operating lever 54 upward against the horizontal lower end of the boss 51, swinging the operating lever 54 into a substantially horizontal position below its path of engagement with the detent notch 60. Impelled by the thrust of the coil spring 50 of the bolt 45, the operating lever 54 swings into the same position as shown in Figure 6. At the same time, the bolt 45 moves forward and its end 96 engages the rearward ends of the now-open coupling jaws 35 in a manner similar to that shown in Figure 6, and holds the jaws 35 open, ready to receive the king pin 86 when the tractor is again backed into coupling engagement with the trailer.

The forms of the invention shown in Figures 1 to 8 inclusive, include two coupling jaws 35. These are provided for greater safety. It will be evident, however, that in place of the two coupling jaws, a single coupling jaw may be employed with equal operability but with a somewhat lower margin of safety. It will also be obvious that the coupling device may be inverted so that the king pin 86 is carried by the tractor and the coupling jaws 35 and their associated mechanism carried by the trailer, in which case Figures 1, 5, 6 and 8 would be considered as bottom plan views instead of top plan views.

While I have shown and described my invention in detail, it is to be understood that the same is to be limited only by the appended claims, for many changes may be made without departing from the spirit and scope of my invention.

What I claim is:

1. A coupling device for a tractor-trailer vehicle having a king pin on one vehicle and a cooperating slotted supporting structure on the other vehicle, comprising a coupling element mounted on said structure and movable to and fro within its slot, an operating lever pivotally mounted on said structure and extending transversely thereacross, said lever having operating handle portions projecting outwardly from opposite sides of said structure, mechanism operatively connecting said operating lever to said coupling element, and a detent on said structure releasably engageable with said operating lever.

2. A coupling device for a tractor-trailer vehicle having a king pin on one vehicle and a cooperating slotted supporting structure on the other vehicle, comprising a coupling element mounted on said structure and movable to and fro within its slot, an operating lever pivotally mounted on said structure and extending transversely thereacross, said lever having operating handle portions projecting outwardly from opposite sides of said structure, mechanism operatively connecting said operating lever to said coupling element, a detent on said structure releasably engageable with said operating lever, and a resilient member yieldably urging said operating lever into holding engagement with said detent.

3. A coupling device for a tractor-trailer vehicle having a king pin on one vehicle and a cooperating slotted supporting structure on the other vehicle, comprising a coupling element mounted on said structure and movable to and fro within its slot, an operating member movably mounted on said structure and having operating portions extending toward and accessible from opposite sides of said structure, mechanism operatively connecting said operating member to said coupling element, a detent on said structure releasably engageable with said operating member, a first resilient member yieldably urging said operating member into holding engagement with said detent, and a second resilient member yieldably urging said operating member transversely out of its path of engagement with said detent.

4. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, and mechanism operatively connecting said lever to said locking bolt.

5. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, and a detent on said structure releasably engageable with said lever in the unlocked position of said coupling element.

6. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, and a resilient member yieldably urging said operating lever into holding engagement with said detent.

7. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, a first resilient member yieldably urging said operating lever into holding engagement with said detent, and a second resilient element yieldably urging said operating lever transversely out of its path of engagement with said detent.

8. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, and a resilient member yieldably urging said operating lever into holding engagement with said detent, said lever being loosely and slidably mounted on said pivot.

9. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, a first resilient member yieldably urging said operating lever into holding engagement with said detent, said lever being loosely and slidably mounted on said pivot, an abutment adjacent said pivot, and a second resilient element urging said lever axially along said pivot into engagement with said abutment and rocking said lever out of its path of engagement with said detent around said abutment as a fulcrum.

10. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, and a resilient element normally urging said bolt into locking engagement with said coupling element.

11. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, and a resilient element normally urging said bolt into locking engagement with said coupling element and urging said lever into holding engagement with said detent.

12. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, a first resilient element normally urging said bolt into locking engagement with said coupling element and urging said lever into holding engagement with said detent, and a second resilient element yieldably urging said operating lever transversely out of its path of engagement with said detent.

13. A coupling device for a tractor-trailer vehicle having a king pin on one vehicle and a cooperating slotted supporting structure on the other vehicle, comprising a coupling element mounted on said structure and movable to and fro within said slot, a locking bolt mounted on said structure and movable into locking engagement with said coupling element, a pivot mounted on said structure, an operating lever having its intermediate portion mounted on said pivot with its ends extending toward and accessible from opposite sides of said structure, mechanism operatively connecting said lever to said locking bolt, a detent on said structure releasably engageable with said lever in the unlocked position of said coupling element, a first resilient element normally urging said bolt into locking engagement with said coupling element and urging said lever into holding engagement with said detent, an abutment adjacent said pivot, and a second resilient element urging said lever axially along said pivot into engagement with said abutment and rocking said lever out of its path of engagement with said detent around said abutment as a fulcrum.

SIDNEY B. WINN.

REFERENCES CITED

The following references are of record in the file of this patent:

UNITED STATES PATENTS

| Number | Name | Date |
|---|---|---|
| 1,981,233 | Harris | Nov. 20, 1934 |
| 2,044,227 | Robb | June 16, 1936 |
| 2,077,484 | King | Apr. 20, 1937 |
| 2,348,977 | Ketel | May 16, 1944 |
| 2,372,976 | Norman et al. | Apr. 3, 1945 |

FOREIGN PATENTS

| Number | Country | Date |
|---|---|---|
| 421,210 | Great Britain | Dec. 17, 1934 |